(12) United States Patent
Geiger et al.

(10) Patent No.: US 8,856,543 B2
(45) Date of Patent: *Oct. 7, 2014

(54) USER IDENTIFICATION WITH BIOKINEMATIC INPUT

(71) Applicant: Microsoft Corporation, Redmond, WA (US)

(72) Inventors: Avi R. Geiger, Seattle, WA (US); Otto Berkes, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/031,328

(22) Filed: Sep. 19, 2013

(65) Prior Publication Data

US 2014/0026212 A1 Jan. 23, 2014

Related U.S. Application Data

(63) Continuation of application No. 12/981,097, filed on Dec. 29, 2010, now Pat. No. 8,543,833.

(51) Int. Cl.
*G06F 21/00* (2013.01)
*G06F 21/32* (2013.01)
*G06F 3/0488* (2013.01)

(52) U.S. Cl.
CPC ............ *G06F 21/32* (2013.01); *G06F 3/04883* (2013.01); *G06F 2203/04808* (2013.01)
USPC ........................................................ 713/186

(58) Field of Classification Search
CPC ......... G06F 21/31; G06F 21/32; G06F 21/36; G06F 21/30; H04L 63/0861

USPC ........................................... 713/186, 182, 183
See application file for complete search history.

(56) References Cited

U.S. PATENT DOCUMENTS

| 4,736,203 | A | 4/1988 | Sidlauskas |
| 6,819,782 | B1 | 11/2004 | Imagawa |

(Continued)

FOREIGN PATENT DOCUMENTS

| KR | 20090020256 | 2/2009 |
| WO | WO-2007089766 | 8/2007 |

OTHER PUBLICATIONS

"Final Office Action", U.S. Appl. No. 12/981,097, (Feb. 14, 2013), 16 pages.

(Continued)

*Primary Examiner* — Edward Zee
(74) *Attorney, Agent, or Firm* — Micah Goldsmith; Glen Johnson; Micky Minhas (57) ABSTRACT

Systems and methods for user identification based on biokinematic input are disclosed herein. The system may include a multi-touch sensitive display including a sensor configured to receive biokinematic input including data representing detected positions of digit touches made by digits of a user, in each of a series of successive time intervals during a defined identification gesture. The system may further include a user identification module executed by a processor of the computing device. The user identification module may be configured to receive the biokinematic input from the sensor, and to compare relative positions of the digit touches and/or relative rates of change in said positions of the digit touches to a stored user template of verified biokinematic data for the user. If a match is determined, an indication that the user has been successfully identified may be displayed.

20 Claims, 4 Drawing Sheets

(56) References Cited

U.S. PATENT DOCUMENTS

| | | |
|---|---|---|
| 7,327,858 B2 | 2/2008 | Weiss |
| 7,394,918 B2 | 7/2008 | Mihara et al. |
| 8,543,833 B2 * | 9/2013 | Geiger et al. ............ 713/186 |
| 2006/0078170 A1 | 4/2006 | Kamata et al. |
| 2006/0280333 A1 | 12/2006 | Ikeda et al. |
| 2006/0280367 A1 | 12/2006 | Kuwabara et al. |
| 2007/0268273 A1 | 11/2007 | Westerman et al. |
| 2008/0002860 A1 | 1/2008 | Super et al. |
| 2008/0052528 A1 | 2/2008 | Poo et al. |
| 2008/0168403 A1 * | 7/2008 | Westerman et al. ....... 715/863 |
| 2009/0085877 A1 * | 4/2009 | Chang et al. ............ 345/173 |
| 2010/0134424 A1 | 6/2010 | Brisebois et al. |
| 2010/0225443 A1 | 9/2010 | Bayram et al. |
| 2012/0174213 A1 | 7/2012 | Geiger |

OTHER PUBLICATIONS

"HandPunch® 3000", Retrieved from <http://www.handpunch.com/pdf/HandPunch3000.pdf>, (2006), 2 pages.

"Non-Final Office Action", U.S. Appl. No. 12/981,097, (Aug. 15, 2012), 13 pages.

"Notice of Allowance", U.S. Appl. No. 12/981,097, (May 24, 2013), 7 pages.

"PCT Search Report and Written Opinion", Application No. PCT/US2011/067430, (Sep. 14, 2012), 9 pages.

* cited by examiner

USER IDENTIFICATION WITH BIOKINEMATIC INPUT

RELATED APPLICATION

This application is a continuation of and claims priority to U.S. patent application Ser. No. 12/981,097, filed Dec. 29, 2010, the disclosure of which is incorporated herein by reference in its entirety.

BACKGROUND

Biometric techniques have been developed to identify humans based on characteristic physical traits, such as fingerprints and palm prints. For example, palm scanners have been developed that are used to authorize or deny access to buildings, and fingerprint scanners have been developed which are used to access websites and files, or logon to an operating system. These systems employ a dedicated scanner with high resolution imaging capabilities sufficient to obtain a detailed scan of the skin patterns on a finger or palm, thereby enabling identification of the characteristic physical traits in those skin patterns that distinguish one user from another.

There are several barriers to adoption of such biometric techniques on tablet computing devices and touch screen mobile telephones. While dedicated fingerprint and palm scanners have been employed on door access panels and laptop computer housings in the past, for example, where there is sufficient space to mount the scanners, most tablet computing devices and touch screen mobile telephones are compact and do not have sufficient space to mount a dedicated fingerprint scanner or palm scanner. Further, the touch screen technologies used in conventional tablet computing devices and mobile telephones are not of sufficiently high resolution to obtain a usable image of the skin patterns on a fingerprint or palm from which user can be distinguished. As a result, the biometric techniques associated with fingerprint and palm scanning have not been widely adopted for tablet computing devices and touch screen mobile telephones.

SUMMARY

Systems and methods for user identification based on biokinematic input are disclosed herein. The system may include a multi-touch sensitive display including a sensor configured to receive biokinematic input including data representing detected positions of digit touches made by digits of a user, in each of a series of successive time intervals during a defined identification gesture. The system may further include a user identification module executed by a processor of the computing device. The user identification module may be configured to receive the biokinematic input from the sensor, and to compare relative positions of the digit touches and/or relative rates of change in said positions of the digit touches to a stored user template of verified biokinematic data for the user. If a match is determined, an indication that the user has been successfully identified may be displayed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
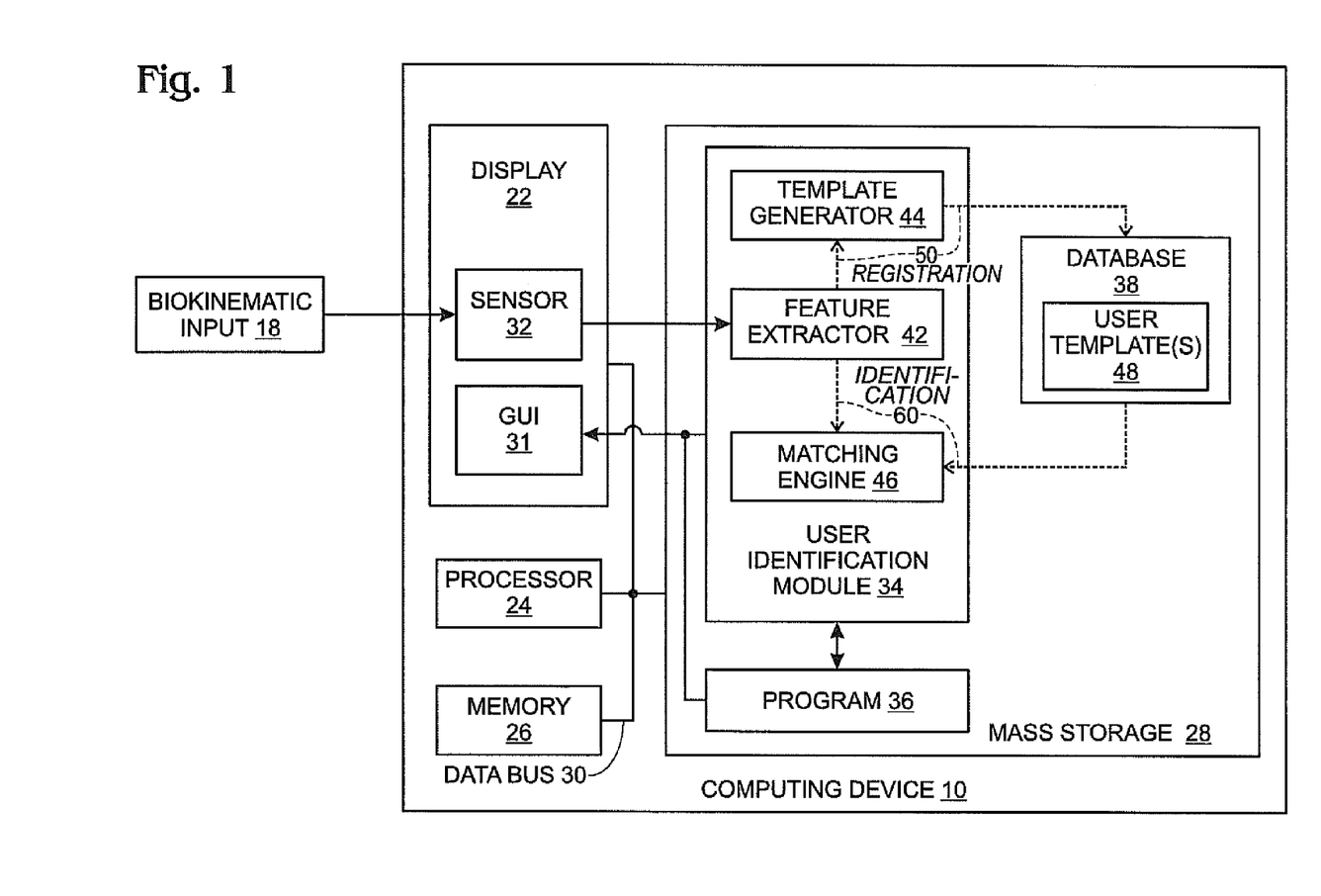
FIG. 1 is schematic view of one embodiment of a computing device configured to perform user identification with biokinematic input.

FIG. 1 is schematic view of one embodiment of a computing device configured to perform user identification with biokinematic input. Computing device 10 may be configured as a portable computing device such as a mobile telephone, a tablet computing device, or a laptop computer, for example. In other examples, computing device 10 may be configured as a personal computer (PC), desktop computer, tabletop computer, or kiosk computer. Computing device 10 includes a display 22, processor 24, memory unit 26, and mass storage unit 28. Programs stored on mass storage unit 28 may be executed by the processor 24 using memory unit 26 and display 22 to achieve various functions described herein. The computing device 10 may be configured to receive biokinematic input from a user during a defined identification gesture and compare the biokinematic input to a stored user template 48. As such, if a match is determined the user may be successfully identified and may be granted access to software, data, or a function of the device.

Display 22 may be a multi-touch touch sensitive display including a sensor 32 for detecting touch input. Display 22 may employ a variety of display technologies for producing a viewable image. Thus, the display may be configured as a liquid crystal display (LCD) or an organic light emitting diode (OLED) display comprised of a plurality of light emitting pixels, for example. Display 22 may also be a tabletop optical touch sensing display such as the MICROSOFT® SURFACE® display.

Sensor 32 may be configured to receive biokinematic input 18, including data representing detected positions of each of a plurality of digit touches made by a corresponding plurality of digits of a user. Sensor 32 may be configured to receive the data in each of a series of successive time intervals during a defined identification gesture of the user. Further, the plurality of digit touches of the defined identification gesture may include at least one palm touch. Thus, for example, the defined identification gesture may be a palm-fist transition gesture, in which the user presents a clenched fist and transitions to an open palm on the multi-touch display, or alternatively presents an open palm and transitions to a clenched fist. Such a gesture will be discussed in greater detail with respect to FIGS. 2 and 3 below. It will be appreciated that this is merely one example of an identification gesture that may be used to distinguish between individuals by the computing device 10. Other identification gestures involving the hands, palms, fingers and/or thumbs moving in various ways may also be used.

Sensor 32 may be any one of a variety of touch sensors. For example, sensor 32 may be a capacitive or resistive multi-touch sensor. In these embodiments, sensor 32 may be configured to detect touch on the top surface of display 22 through changes in detected capacitance or resistance caused by each of a plurality of digit and/or palm touches.

Alternatively, other touch sensitive technologies may be employed. For example, display 22 may include optical sensors 32, which may be positioned in each pixel of the display, to sense light, and output from these optical sensors may be processed to detect multiple touches on the top surface of the display. These optical sensors may be configured to sense visible light and infrared light, in one example. For instance, the optical sensor may be an active pixel sensor (APS), such as a complementary metal-oxide semiconductor (CMOS) or any other APS configured to sense visible light and infrared light.

Computing device 10 may include mass storage unit 28, such as a hard drive. Mass storage unit 28 may be in operative communication with display 22, processor 24, and memory unit 26 via data bus 30, and is configured to store programs that are executed by processor 24 using portions of memory 26, and other data utilized by these programs. For example, the mass storage device 28 may store a user identification module 34 and associated database 38. The mass storage device 28 may further store a program 36 that requests identification be performed by the user identification module 34, such as an application program, an operating system component such as a login program or user authentication program, or other program executing on the computing device. The user identification module 34 and program 36 may be executed by processor 24 of computing device 10 using portions of memory 26.

User identification module 34 may operate in various different phases, such as registration phase 50 and identification phase 60, for example. Each phase may be associated with different components of user identification module 34, as described below.

The user identification module 34 may be configured to receive biokinematic input 18 from sensor 32. The biokinematic input originates from sensor 32 sensing a moving body part of a user. To distinguish one user from another, the user identification module 34 may be configured to compare relative positions of a plurality of digit touches and/or palm touches contained within the biokinematic input. It will be appreciated that touches from more, fewer, or other body parts may also be examined. Additionally or alternatively, user identification module 34 may be configured to compare relative rates of change in said positions of the plurality of touches over time.

The received biokinematic input 18 may be compared to stored user template 48 of verified biokinematic data for the user, which may have been previously verified and saved by user identification module 34 during a registration phase, as discussed below. If a match between the biokinematic input and stored user template 48 is determined, display 22 may display an indication that the user has been successfully identified.

As another example, user identification module 34 may be configured to measure the relative positions and/or rates of change in said positions of the plurality of digit touches relative to at least one palm touch during the palm-fist transition gesture. Then, user identification module 34 may compare the measured relative positions and/or rates of change to stored user template 48 to determine whether a match exists. To accomplish this, user identification module 34 may generate a template of user biokinematic data and compare the template to a stored user template 48 representing biokinematic data.

The internal workings of user identification module 34 will now be described, with reference to a registration phase 50, during which new users of computer device 10 are registered with biokinematic input used to verify user identity, and an identification phase 60 during which users are identified and granted or denied access privileges, in the manner described above. As illustrated, user identification module may include a feature extractor 42, template generator 44, and matching engine 46, which function as described in detail below.

During registration phase 50, feature extractor 42 may be configured to receive a first biokinematic input from sensor 32 and extract user-identifying features from the first biokinematic input. The user identifying features may be specific to each user, that is, a set of particular features may be associated with one user and may be different from the particular features of another user. Thus, the particular features may be used to identify one user and distinguish that user from other potential users. The first biokinematic input may include relative positions of the plurality of digit touches and in some embodiments at least one palm touch, and may include the relative rates of change in said positions of these touches. As explained above, the first biokinematic input may include data from a series of successive time intervals during a defined identification gesture, for example, a palm-fist transition.

Feature extractor 42 may extract user-identifying features using any number of techniques. For example, feature extractor 42 may process an image by filtering, identifying an outline of a user's hand and/or computing a centroid of one or more digit and/or palm touches. It will be appreciated that the aforementioned examples may be used in combination or subcombination and may further include additional or alternative means for extracting user-identifying features without departing from the scope of this disclosure. The feature extractor 42 may send an output of extracted user-identifying features to the template generator 44 for further processing.

Continuing with the registration phase 50, template generator 44 may create a template of data characteristic to a user from the first biokinematic input received by feature extractor 42. Template generator 44 may be configured to generate a user template 48 including the user-identifying features for given user and given identification gesture, and store user template 48 in a data store, such as database 38. Storing such characteristic data for each user, the user templates 48 may be used to compare to biokinematic data received during a subsequent user identification phase 60, and determine whether a match exists, in order to identify the user.

Database 38 may store a plurality of user templates 48 for a plurality of users authorized to software or data on access computing device 10. In some embodiments, different gestures classes may be used to register the various users, and thus more than one user template 48 may exist for each user. For example, one class may be a palm-fist transition gesture and another class may be a finger-thumb pinch gesture, and a separate user template 48 may be stored for each authenticated user who has been registered to use the computing device 10.

Turning now to the user identification phase 60, this phase may be implemented during any number of user authentication operations such as a login operation, opening a protected folder, opening a protected file, accessing a protected program, accessing a protected network, or any other application where user authentication is desired. For example, user identification module 34 may be executed during a user authentication operation, such as user login to a user session on computing device 10.

During user identification phase 60, feature extractor 42 may receive a second biokinematic input from sensor 32. The second biokinematic input may include relative positions of the plurality of digit touches and at least one palm touch, and may include relative rates of change in said positions of these touches. Second biokinematic input may also include data for these touches from a series of successive time intervals during a defined identification gesture. For example, user identification phase 60 may be performed in a gesture-based user login operation on a login screen, such as a palm-fist transition, as described above.

The output of the feature extractor 42 during the user identification phase 60 may be sent to the matching engine 46. The matching engine 46 may compare the second biokinematic input to stored user template 48, which was created based on features extracted from the first biokinematic input, in order to verify the biokinematic data of the user. In some embodiments, the user may input a user name to computing device 10, and the biokinematic input may be matched as described herein, in order to verify the user's identity, instead of or in addition to using a PIN number or password, for example. If multiple templates for different gesture classes are available for a given user, matching engine 46 may recognize the second biokinematic input as belonging to a particular gesture class, such as a palm-fist transition, and may therefore compare the second biokinematic input to stored user templates 48 belonging to the same gesture class.

In other embodiments, which are particularly useful where the total number of registered users of a computing device 10 is small, the user does not enter a user name, but simply presents the identification gesture, and the user identification module searches for a user template that matches the features extracted from the biokinematic input for the presented identification gesture.

Matching engine 46 may determine whether a match exists between the features extracted from the second biokinematic data and the user templates. If a match exists, the user is determined to have been successfully identified. Matching engine 46 may employ any number of techniques to determine that a match exists. For example, matching engine 46 may compare a characteristic or combination of characteristics of the second biokinematic input corresponding to a plurality of digit and/or palm touches to the area of touches corresponding to one or more user templates 48 within a predetermined tolerance. The characteristic may be total area, centroid, length of each digit from tip to palm, relative lengths of each digit from tip to palm, as well as the rate of change of any of these characteristics over time during the gesture. Alternatively, matching engine 46 may compare such a characteristic or combination of characteristics of the second biokinematic input to a predetermined normal model for all users. In other words, matching engine 46 may be configured to calculate a deviation of the second biokinematic input from the predetermined normal model and determine if the deviation of the second biokinematic input matches, within a predetermined threshold, the deviation of a corresponding user template.

When a match is determined, an indication of such an event may be displayed to the user. For example, the indication may be a message outputted to graphical user interface 31 of the display 22 after a successful user login operation. In one embodiment, the graphical user interface 31 may include a login screen, and the indication may be a message displayed on the login screen of successful login. Alternatively, the indication may be cessation of the login screen being displayed to the user. Following display of a message and/or cessation of a login screen, the user may be granted access to program 36, file, folder, application, network, operating system, etc., on computing device 10.

Figure 2:
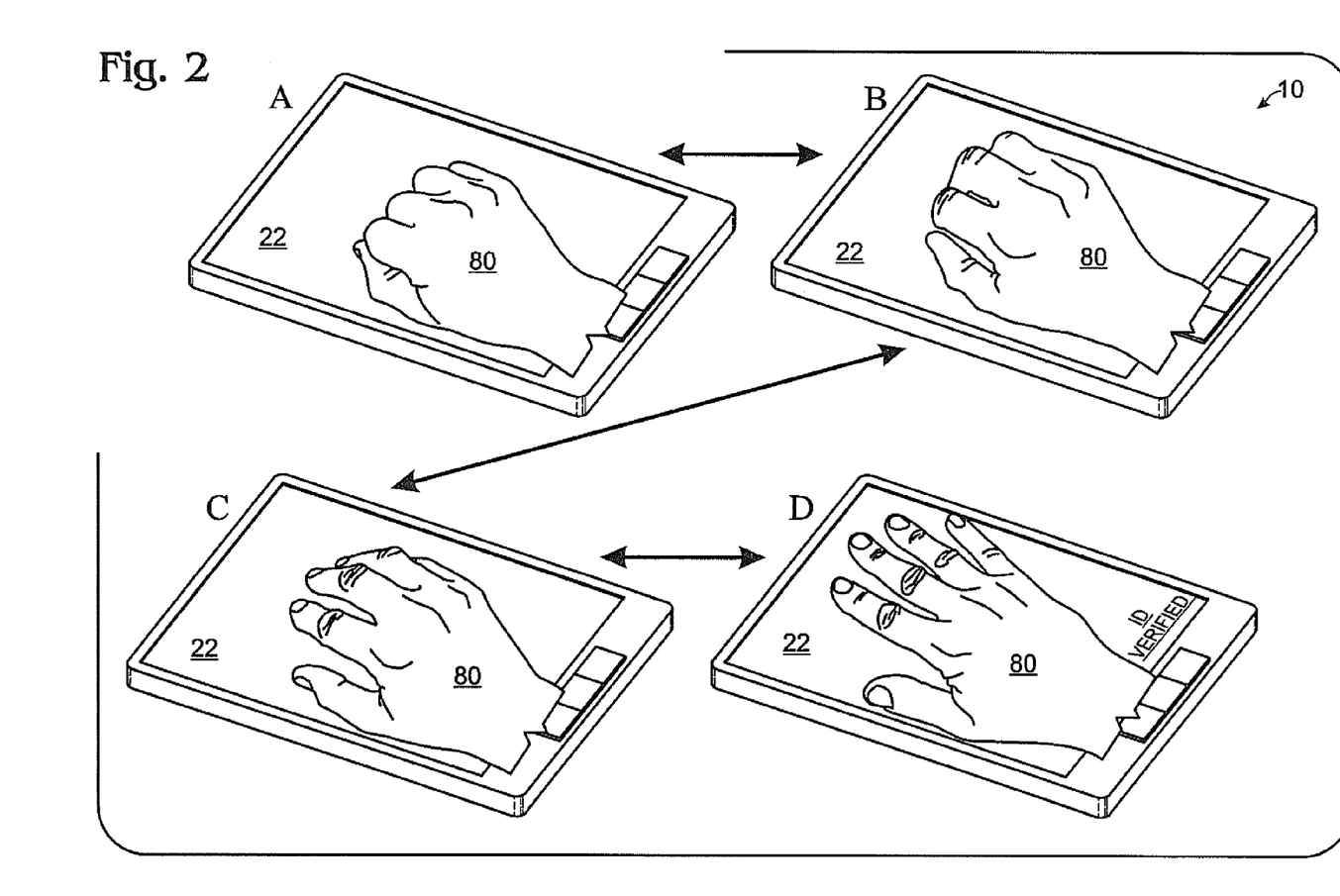
FIG. 2 is perspective view of the computing device configured to perform user identification with biokinematic input of FIG. 1, illustrating a series of hand positions in a palm-fist transition gesture on a tablet computing device.

FIG. 2 is perspective view of the computing device configured to perform user identification with biokinematic input of FIG. 1, illustrating a series of hand positions in a palm-fist transition gesture on a portable tablet computing device. FIG. 2 illustrates a user hand 80 interacting with computing device 10 by making contact with display 22. FIG. 2, at A-D, shows user hand 80 in different positions, that in sequence (A to D, or D to A) represent a transition from a clenched fist to an open palm and vice versa, where a clenched fist is depicted in A and an open palm is depicted in D with intermediate illustrations shown in B and C. Such a movement may be defined as a palm-fist transition gesture, and may be used as an identification gesture in order to gain access to computing device 10 and/or features of computing device 10 as already described. One example message serving as an indication of successful identification is shown at D in FIG. 2. It will be appreciated that the palm-fist transition gesture is merely one illustrative embodiment of an identification gesture that may be used by the systems and methods described herein. Numerous other identification gestures are contemplated that involve relative movement between a plurality of digits and/or a palm, or other body parts, of a user.

Figure 3:
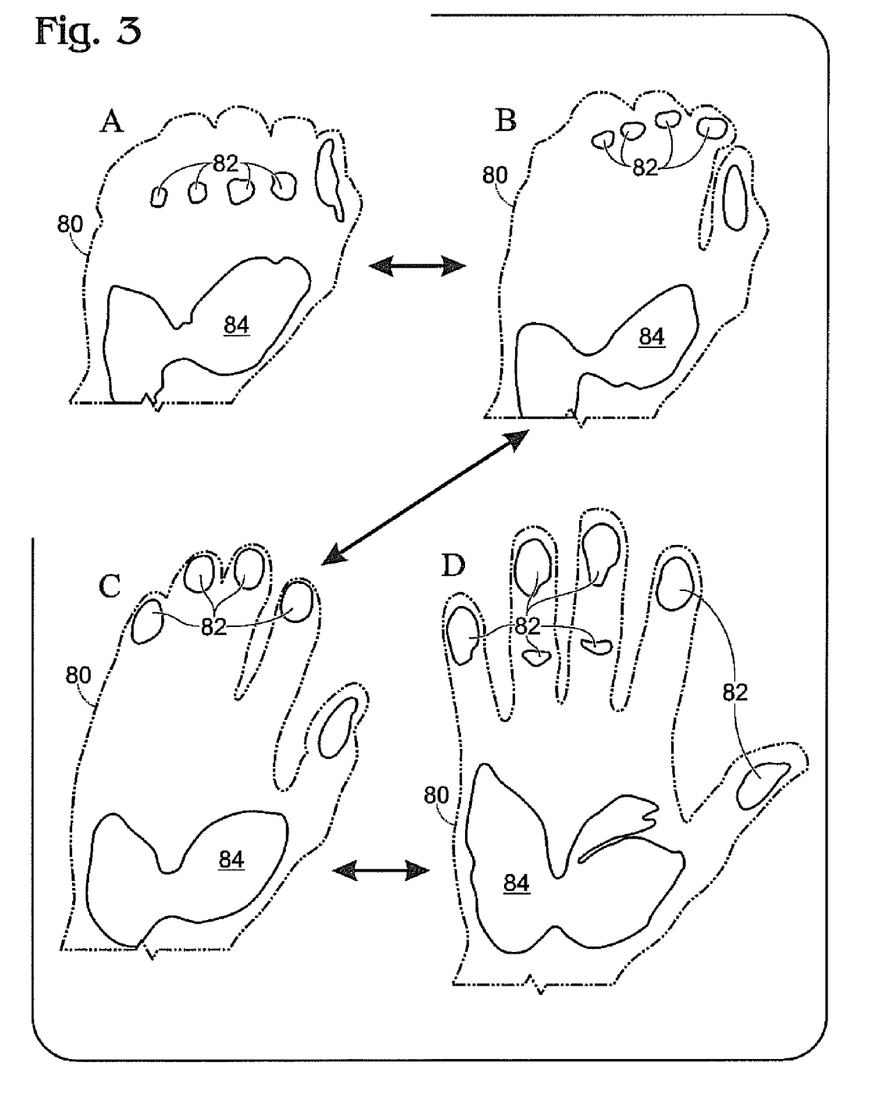
FIG. 3 is a graphical view showing a plurality of touches corresponding to the series of hand positions shown in FIG. 2.

FIG. 3 is a graphical view showing a plurality of touches corresponding to the series of hand positions shown in FIG. 2. FIG. 3 illustrates areas of user hand 80 that may make physical contact with display 22 during a palm-fist transition gesture. Such points of contact may include a plurality of digit touches 82 and palm touch 84. For example, when user hand 80 forms a fist as shown at A of FIG. 2, a plurality of digit touches 82 and palm touch 84, as shown at A of FIG. 3 may be received by sensor 32. As user hand 80 continues the palm-fist transition gesture, the relative positions of digit touches 82 and palm touch 84 may change, as seen from A-D, and likewise from D-A. Further, the relative rates of change between each of the digit touches 82 and palm touch 84 may be measured as already described.

It will be appreciated that biokinematic data may be received from the plurality of digit and/or palm touches without the user hand making physical contact with the device. In other words, the sensor of the device may be configured to receive biokinematic data from a user hand that is substantially close to the device. Alternatively, the sensor may be configured to sense the hand position when the hand is positioned proximate and spaced apart from the display 22, as is the case with optical sensors and some capacitive sensors, for example.

Biokinematic input may be specific to a user because user hands may vary greatly in size, relative position, and relative rates of change between the plurality of digit touches and palm touches when the hand is moving during the identification gesture. Therefore, such biokinematic input may be used as a virtual signature representative of a particular user and thereby creating a means for which authentication of a user may be verified.

Figure 4:
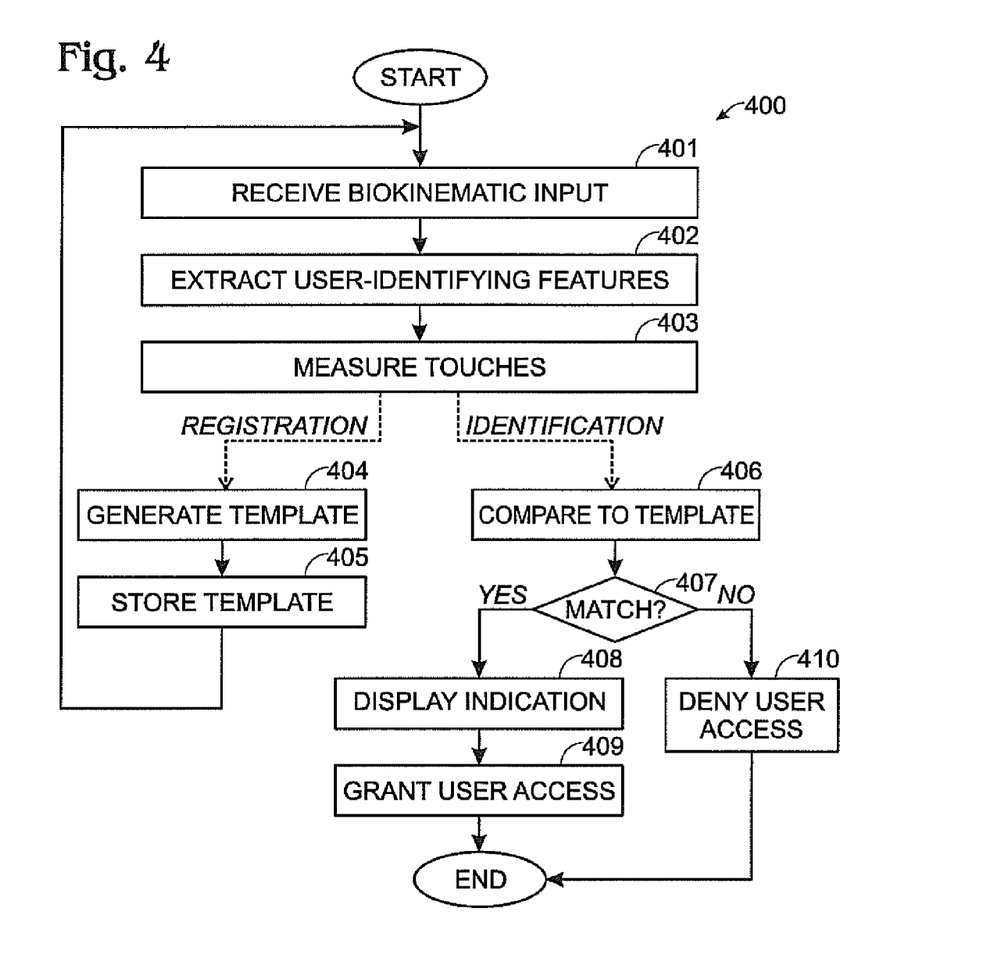
FIG. 4 is a schematic view of one embodiment of a computerized user identification method for user identification with biokinematic input.

FIG. 4 is a schematic view of one embodiment of a computerized user identification method 400. The method 400 may be performed using the software and hardware components of computing device 10 described above, or using other suitable components. Method 400 begins at 401, with a multi-touch sensitive display, such as display 22 of computing device 10, receiving user biokinematic input 18 associated with an identification gesture, such as a palm-fist transition gesture as shown in FIG. 2, or other identification gesture.

At 402, method 400 proceeds to extract user-identifying features. For example, a plurality of digit touches and/or palm touches made by a corresponding plurality of digits and/or palms of a user as shown in FIG. 3 may be extracted. User-identifying features may be extracted in each of a series of successive time intervals.

At 403, method 400 proceeds by measuring the plurality of digit touches and/or palm touches made by the user. For example, biokinematic input 18 corresponding to the palm-fist transition gesture may be measured according to the relative positions and/or relative rates of change of each of the plurality of digit touches and/or palm touches.

During a registration phase as described above, method 400 may proceed to 404 and may include generating a user template 48 of the biokinematic input (referred to as first biokinematic input in the context of FIG. 1 above), corresponding to the user palm-fist transition gesture. Generating a user template 48 may include verifying, through additional steps, that the first biokinematic input has a high integrity or repeatability. For example, verifying may include a user repeating the same identification gesture more than once prior to the creation of the user template 48. As such, the template generator may recognize distinctive patterns of the user with greater confidence.

At 405, method 400 proceeds by storing the user template 48 acquired during the registration phase in a data store, such as database 38 of computing device 10, which may then be used during other phases of the computing device 10. From 405, the method loops back to 401 to receive another biokinematic input during an identification phase of the method.

During the identification phase, method 400 repeats steps 401-403, where biokinematic input corresponding to an identification gesture, such as the palm-fist transition gesture, may be received as a second biokinematic input during a second pass through these steps. The method proceeds along the identification path to 406, where the method compares the second biokinematic input to a stored user template 48 of verified biokinematic data in the database. Comparing may include an analysis of the respective positions and/or respective rates of change in a plurality of digit touches and/or palm touches during at least a portion of the identification gesture such as the palm-fist transition gesture, as described above.

At 407, method 400 determines if a match between the second biokinematic input and the stored user template 48 within a predetermined tolerance exists. If the answer to 407 is YES, method 400 proceeds to 408 and an indication may be outputted to the display in the form of a message to indicate that the user has been successfully identified. Alternatively, the indication may be a cessation of a login screen being displayed to the user.

Method 400 then proceeds to 409 and the user is granted access to a program, file, folder, application, operating system, etc. on the computing device. From 409 the identification phase of the method ends.

If the answer to 407 is NO, method 400 proceeds to 410 and the user is denied access to the program, file, folder, application, operating system, etc. on the computing device. From 410 the identification phase of the method either ends. Alternatively, in some embodiments, the disclosed method may additionally display an indication to the user when a match does not occur and access is denied, and/or may present a GUI allowing the user to reenter biokinematic input to compare to user template 48, to allow the user to correct any input errors that may have occurred the first time around.

It will be appreciated that method 400 may include additional or alternative steps. As one example, the method may include a mechanism for determining which phase (e.g. registration phase 50 or identification phase 60) to operate in. Typically, when the user identification module is called by an operating system component registering a new user account on the computing device, the registration phase will be invoked. And, when an operating system component such as a login program, or when an application program call the user identification module, the identification phase is invoked. When the user identification module is part of an application programming interface (API), suitable application programming interface function calls for each phase may be provided.

The above described systems and methods may be used to incorporate biokinematic-based security for controlling access to software, data, or other functionality of a computing device. These systems and methods offers convenience to the user, while having the advantage of being implementable without a dedicated fingerprint or palm scanner as featured on prior devices.

The terms "module," "program," and "engine" are used herein to refer to software that performs one or more particular functions when executed by a processor of a computing device. These terms are meant to encompass individual or groups of executable files, data files, libraries, drivers, scripts, database records, for example. The embodiments described herein show one example organization of these modules, programs, and engines, however, it should be appreciated that the functions described herein may be accomplished by differently organized software components.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computer-implemented method, comprising:
receiving user biokinematic input of an identification gesture including one or more digit touches made by a corresponding one or more digits of a user via a multi-touch sensitive display of a computing device;
comparing the received user biokinematic input to a stored user template of verified biokinematic data for the user, the stored user template generated from user identifying features extracted from previous biokinematic input associated with the user, the user-identifying features including at least one of an outline of the user's hand or a centroid of one or more previous digit touches made by a corresponding one or more digits of the user; and
displaying an indication on the display that the user has been successfully identified if a match is determined by the comparing.

2. The computer-implemented method of claim 1, wherein the user biokinematic input of the identification gesture includes at least one palm touch.

3. The computer-implemented method of claim 2, wherein the identification gesture is a palm-fist transition gesture.

4. The computer-implemented method of claim 1, wherein the receiving, the comparing, and the displaying are performed during a user authentication operation on the computing device.

5. The computer-implemented method of claim 4, wherein the user authentication is implemented during login of the user to a user session on the computing device.

6. The computer-implemented method of claim 5, wherein the indication is a message outputted to the display after a successful user login operation, or the indication is cessation of a login screen being displayed to the user and access being granted to a program, file, or operating system on the computing device.

7. The computer-implemented method of claim 1, wherein the computing device comprises one of a personal computer, desktop computer, tabletop computer, kiosk computer, mobile phone, tablet computing device, or laptop computer.

8. A computer-readable storage device comprising instructions stored thereon that, responsive to execution by a processor, perform operations comprising:
receiving user biokinematic input of an identification gesture including a plurality of digit touches made by a corresponding plurality of digits of a user, in each of a series of successive time intervals, via a multi-touch sensitive display of a computing device, the identification gesture comprising a palm-fist transition gesture;
comparing respective positions and respective rates of change in said positions of the plurality of digit touches during at least a portion of the identification gesture in the biokinematic input to a stored user template of verified biokinematic data for the user, the stored user template generated from user identifying features extracted from previous biokinematic input associated with the user; and
displaying an indication on the display that the user has been successfully identified if a match is determined by the comparing.

9. The computer-readable storage device of claim 8, wherein the operations further comprise measuring the respective positions and/or rates of change in said positions of the plurality of digit touches relative to at least one palm touch during the palm-fist transition gesture, and comparing these measured respective positions and/or rates of change to the stored user template to determine whether a match exists.

10. The computer-readable storage device of claim 8, wherein the receiving, the comparing, and the displaying are performed during a user authentication operation on the computing device.

11. The computer-readable storage device of claim 10, wherein the user authentication is implemented during login of the user to a user session on the computing device.

12. The computer-readable storage device of claim 11, wherein the indication is a message outputted to the display after a successful user login operation, or the indication is cessation of a login screen being displayed to the user and access being granted to a program, file, or operating system on the computing device.

13. The computer-readable storage device of claim 8, wherein the computing device comprises one of a personal computer, desktop computer, tabletop computer, kiosk computer, mobile phone, tablet computing device, or laptop computer.

14. A computing device, comprising:
a multi-touch sensitive display including a sensor configured to receive biokinematic input including data representing detected positions of one or more digit touches made by a corresponding one or more digits of a user, in each of a series of successive time intervals during a defined identification gesture;
a user identification module executed by a processor of the computing device, the user identification module being configured to receive the biokinematic input from the sensor, the user identification module including:
a feature extractor configured to, in a registration phase, receive a first biokinematic input from the sensor and extract user-identifying features from the first biokinematic input, the first biokinematic input comprising relative positions of the one or more digit touches and/or relative rates of change in said positions of the one or more digit touches, and the user-identifying features including at least one of an outline of the user's hand or a centroid of one or more of the digit touches; and
a template generator configured to generate a user template including the user-identifying features and store the user template in a data store.

15. The computing device of claim 14, wherein the one or more digit touches of the identification gesture include at least one palm touch.

16. The computing device of claim 15, wherein the identification gesture is a palm-fist transition gesture.

17. The computing device of claim 14, wherein the sensor is a capacitive multi-touch sensor.

18. The computing device of claim 14, wherein the computing device comprises one of a personal computer, desktop computer, tabletop computer, kiosk computer, mobile phone, tablet computing device, or laptop computer.

19. The computing device of claim 14, wherein the sensor is configured to receive additional biokinematic input during a user authentication operation on the computing device.

20. The computing device of claim 19, wherein the user authentication operation is implemented during login of the user to a user session on the computing device.

* * * * *